United States Patent
Chono

(10) Patent No.: US 8,005,317 B2
(45) Date of Patent: Aug. 23, 2011

(54) PROTECTED IMAGE RESOLUTION CONVERSION

(75) Inventor: Keiichi Chono, Tokyo (JP)

(73) Assignee: NEC Corporation, Tokyo (JP)

( * ) Notice: Subject to any disclaimer, the term of this patent is extended or adjusted under 35 U.S.C. 154(b) by 993 days.

(21) Appl. No.: 11/815,544

(22) PCT Filed: Jan. 30, 2006

(86) PCT No.: PCT/JP2006/301475
§ 371 (c)(1),
(2), (4) Date: Aug. 3, 2007

(87) PCT Pub. No.: WO2006/082789
PCT Pub. Date: Aug. 10, 2006

(65) Prior Publication Data
US 2009/0016607 A1    Jan. 15, 2009

(30) Foreign Application Priority Data
Feb. 7, 2005   (JP) ................................ 2005-029930

(51) Int. Cl.
*G06K 9/00* (2006.01)
*G06K 9/32* (2006.01)
*G06K 9/36* (2006.01)
(52) U.S. Cl. ........ 382/284; 382/181; 382/232; 382/298; 382/299

(58) Field of Classification Search .................. 382/232, 382/284, 298, 299
See application file for complete search history.

(56) References Cited

U.S. PATENT DOCUMENTS

| | | | |
|---|---|---|---|
| 6,590,601 B2 * | 7/2003 | Sukeno et al. | 348/14.01 |
| 7,277,115 B2 * | 10/2007 | Makinouchi et al. | 348/14.01 |
| 7,375,767 B2 * | 5/2008 | Lee et al. | 348/581 |
| 2001/0033324 A1 * | 10/2001 | Sukeno et al. | 348/14.01 |
| 2007/0147709 A1 * | 6/2007 | Lee et al. | 382/299 |

FOREIGN PATENT DOCUMENTS

| | | |
|---|---|---|
| JP | 62-198967 A | 9/1987 |
| JP | 2000-287070 A | 10/2000 |
| JP | 2001-309325 A | 11/2001 |
| JP | 2004-253946 A | 9/2004 |
| KR | 10-2005-0011781 A | 1/2005 |
| KR | 10-2005-0012991 A | 2/2005 |

* cited by examiner

*Primary Examiner* — Bhavesh M Mehta
*Assistant Examiner* — Stephen R Koziol
(74) *Attorney, Agent, or Firm* — Sughrue Mion, PLLC

(57) ABSTRACT

When an original image in which an object to be concealed is mosaicked is so reduced as to have a low resolution, the mosaic block size at the lowered resolution is computed. It is judged whether or not the concealed object can be perceived by the eye of a human even though the object is mosaicked with the reduced mosaic block size. If so, the concealed object is re-mosaicked with an adequate re-mosaic block size. With this, even for a reduced image reduced by lowering the resolution of the original image in which the object to be concealed is mosaicked, the privacy of the concealed object can be protected.

26 Claims, 7 Drawing Sheets

PROTECTED IMAGE RESOLUTION CONVERSION

APPLICABLE FIELD IN THE INDUSTRY

The present invention relates to a technology of an image process, and more particularly to a technology of re-mosaicking a mosaic arranged in an image.

BACKGROUND ART

Recently, accompanied by a digital broadcast, realization of widening a band of a communication path, or the like, the opportunity of delivering high-resolution image contents such as HDTV (High Definition TV) has increased. As one example, in a ground digital broadcasting format of our country, one channel is divided into thirteen [segments], and some of these segments are bundled, thereby to broadcast video, data, voice, etc. It seems that assigning the twelve segments to a high-vision broadcast (high-resolution broadcast) and one segment to a mobile-body broadcast (low-resolution broadcast), out of the foregoing thirteen segments, incurs an increase in the opportunity of delivering the identical contents at both of a high-resolution and a low-resolution.

In a case of receiving/reproducing the high-resolution image contents such as the HDTV (High Definition TV) in a mobile terminal etc., the high-resolution image contents such as the HDTV, as shown in FIG. 1, is reduced so as to have a low-resolution image such as QVGA (Quarter Video Graphics Array) due to limits to a resolution of a display device of the terminal and a bandwidth of a communication path. FIG. 1 shows the state in which the HDTV image of 1920 pixel by 1080 pixel is reduced into an image of 320 pixel by 180 pixel that is displayable with the QVGA at a reduction ratio of 1/6.

A resolution converter 100 having such a reduction function is shown in FIG. 2.

The resolution converter 100 is configured of an image reducer 1001. The image reducer 1001 reduces the image having a resolution that has been input into an image having a reduced resolution that has been input, and outputs a reduced image. This resolution converter 100 is arranged before the stage of transmitting the image as shown in FIG. 3 in some cases, and is arranged before the stage of reproducing the image as shown in FIG. 4 in some cases. Such a resolution converter 100 makes it possible to receive or reproduce the high-resolution image contents of the HDTV at the mobile terminal irrespectively of limits to a resolution of the display device of the terminal and a bandwidth of the communication path.

DISCLOSURE OF THE INVENTION

Problems to be Solved by the Invention

By the way, in a television or mass media, there is the case of performing a mosaicking process in which the image of a predetermined portion such a face (hereinafter, referred to as a mosaic area) is processed in a block shape for a purpose of protecting personal privacy.

A principle of this mosaicking lies in a point that as shown in FIG. 5, the mosaic area is divided into square blocks having a certain specific size (hereinafter, referred to as a mosaic block size), and the pixel value of one arbitrary pixel within the foregoing block is assumed to be the pixel value of the entirety of its block. Further, there is also the case that not the pixel value of one pixel but the average pixel value of the pixels within the block is assumed to be the latter.

However, in a case of having reduced the HDTV-resolution contents, which has been mosaicked, so as to have, for example, a QVGA resolution for a purpose of receiving/reproducing video at the mobile terminal etc. the block-shaped mosaic results in disappearing, which gives rise to the problem that an original objective of protecting the personal privacy cannot be realized. For example, in a case of reducing the HDTV-resolution contents of which the mosaic block size at the HDTV resolution is a size of 8 pixel by 8 pixel so as to have a resolution as low as a QVGA resolution (the reduction ratio is 1/6), the mosaic block size at the QVGA resolution becomes a size of approx. 1 pixel by approx. 1 pixel (8/6 pixel by 8/6 pixel), the block-shaped mosaic disappears, and the mosaic looks as if the mosaic had been canceled.

Thereupon, the present invention has been accomplished in consideration of the above-mentioned problems, and an object thereof is to provide an image processing device, a program, a re-mosaicking method, and a device employing these that enables the privacy of the to-be-concealed object to be protected even in a reduced image reduced by lowering the resolution of an original image in which the to-be-concealed object has been mosaicked.

Further, an object of the present invention is to provide an image processing device, a program, a re-mosaicking method, and a device employing these that allows the re-mosaicking process to be performed with blocks having a block size such that the to-be-concealed object cannot be recognized visually even in a reduced image reduced by lowering the resolution of an original image in which the to-be-concealed object has been mosaicked.

Means to Solve the Problem

The 1st invention for solving the above-mentioned problem, is an image processing device comprising: a means for judging whether or not a mosaic block size of a mosaic arranged in a to-be-concealed object of an original image is a size such that reducing the original image allows the mosaic to disappears visually; and a re-mosaicking means for, in a case where it has been judged by said judgment means that the mosaic arranged in said to-be-concealed object disappears visually, re-mosaicking the to-be-concealed object of said original image with blocks having a re-mosaic block size such that the mosaic does not disappear visually even though said original image is reduced.

The 2nd invention for solving the above-mentioned problem, is an image processing device comprising: a comparison means for, based upon a reduction ratio, being a ratio of a resolution and a reduced resolution of an image that has been input, computing a reduced mosaic block size of a to-be-concealed object at the reduced resolution, and comparing said reduced mosaic block size with a predetermined threshold; and a re-mosaicking means for, in a case where said reduced mosaic block size is less than said predetermined threshold, re-mosaicking the to-be-concealed object of said input image with blocks having a re-mosaic block size such that the mosaic does not disappear visually even though said original image is reduced.

The 3rd invention for solving the above-mentioned problem, in the above-mentioned 2nd invention, is characterized in that said predetermined threshold is a mosaic block size such that an eye of a human cannot perceive said to-be-concealed object in the reduced-resolution image.

The 4th invention for solving the above-mentioned problem, in the above-mentioned 2nd or 3rd invention, is characterized in that said predetermined threshold is a two-pixel size.

The 5th invention for solving the above-mentioned problem, in the above-mentioned 2nd to 4th invention, is characterized in that said re-mosaicking means performs a re-mosaicking process with blocks having a re-mosaic block size such that an eye of a human cannot perceive the to-be-concealed object in the reduced image in which the original image has been reduced.

The 6th invention for solving the above-mentioned problem, in the above-mentioned 5th invention, is characterized in that said re-mosaicking means re-mosaics the reduced image of the original image with blocks having a re-mosaic block size such that an eye of a human cannot perceive the to-be-concealed object in the reduced image in which the original image has been reduced.

The 7th invention for solving the above-mentioned problem, in the above-mentioned 5th invention, is characterized in that said re-mosaicking means re-mosaics the original image with blocks having a re-mosaic block size such that an eye of a human cannot perceive the to-be-concealed object in the reduced image in which the original image has been reduced.

The 8th invention for solving the above-mentioned problem, in the above-mentioned 2nd to 7th invention, is characterized that said re-mosaicking means performs a re-mosaicking process on a frequency area.

The 9th invention for solving the above-mentioned problem, is an image transmitter comprising: a comparison means for, based upon a reduction ratio, being a ratio of a resolution and a reduced resolution of an image that has been input, computing a reduced mosaic block size of a mosaic arranged in a to-be-concealed object of a reduced-resolution image, and comparing said reduced mosaic block size with a predetermined threshold; a re-mosaicking means for, in a case where said reduced mosaic block size is less than said predetermined threshold, re-mosaicking the to-be-concealed object of said original image with blocks having a re-mosaic block size such that the mosaic does not disappear visually even though said original image is reduced; and a transmission means for encoding the re-mosaicked image to transmit it.

The 10th invention for solving the above-mentioned problem, is an information processing terminal comprising: a decoding means for decoding received image data; a comparison means for, based upon a reduction ratio of a resolution of said decoded image over that of an original image, computing a mosaic block size of a mosaic arranged in a to-be-concealed object of said image, and comparing said mosaic block size with a predetermined threshold; a re-mosaicking means for, in a case where said mosaic block size is less than said predetermined threshold, re-mosaicking the to-be-concealed object of said original image with blocks having a re-mosaic block size such that the mosaic does not disappear visually even though said original image is reduced; and a display means for displaying the re-mosaicked image.

The 11th invention for solving the above-mentioned problem, is an image processing program of an image processing device, characterized in causing said image processing device to function as: a means for judging whether or not a mosaic block size of a mosaic arranged in a to-be-concealed object of an original image is a size such that reducing the original image allows the mosaic to disappears visually; and a re-mosaicking means for, in a case where it has been judged by said judgment means that the mosaic arranged in said to-be-concealed object disappears visually, re-mosaicking the to-be-concealed object of said original image with blocks having a re-mosaic block size such that the mosaic does not disappear visually even though said original image is reduced.

The 12th invention for solving the above-mentioned problem, is an image processing program of an image processing device, characterized in causing said image processing device to function as: a comparison means for, based upon a reduction ratio, being a ratio of a resolution and a reduced resolution of an image that has been input, computing a reduced mosaic block size of a mosaic arranged in a to-be-concealed object of a reduced-resolution image, and comparing said reduced mosaic block size with a predetermined threshold; and a re-mosaicking means for, in a case where said reduced mosaic block size is less than said predetermined threshold, re-mosaicking the to-be-concealed object of said original image with blocks having a re-mosaic block size such that the mosaic does not disappear visually even though said original image is reduced.

The 13th invention for solving the above-mentioned problem, in the above-mentioned 12th invention, is characterized in that said predetermined threshold is a mosaic block size such that an eye of a human cannot perceive said to-be-concealed object in the reduced-resolution image.

The 14th invention for solving the above-mentioned problem, in the above-mentioned 12th or 13th invention, is characterized in that said predetermined threshold is a two-pixel size.

The 15th invention for solving the above-mentioned problem, in the above-mentioned 12th to 14th invention, is characterized in causing said re-mosaicking means to function so as to perform a re-mosaicking process with blocks having a re-mosaic block size such that an eye of a human cannot perceive the to-be-concealed object in the reduced image in which the original image has been reduced.

The 16th invention for solving the above-mentioned problem, in the above-mentioned 15th invention, is characterized in causing said re-mosaicking means to function so as to re-mosaic the reduced image of the original image with blocks having a re-mosaic block size such that an eye of a human cannot perceive the to-be-concealed object in the reduced image in which the original image has been reduced.

The 17th invention for solving the above-mentioned problem, in the above-mentioned 15th invention, is characterized in causing said re-mosaicking means to function so as to re-mosaic the original image with blocks having a re-mosaic block size such that an eye of a human cannot perceive the to-be-concealed object in the reduced image in which the original image has been reduced.

The 18th invention for solving the above-mentioned problem, in the above-mentioned 12th to 17th invention, is characterized causing said re-mosaicking means to function so as to perform a re-mosaicking process on a frequency area.

The 19th invention for solving the above-mentioned problem, a mosaicking method, characterized in comprising the steps of: judging whether or not a mosaic block size of a mosaic arranged in a to-be-concealed object of an original image is a size such that reducing the original image allows the mosaic to disappears visually; and in a case where it has been judged that the mosaic arranged in said to-be-concealed object disappears visually, re-mosaicking the to-be-concealed object of said original image with blocks having a re-mosaic block size such that the mosaic does not disappear visually even though said original image is reduced.

The 20th invention for solving the above-mentioned problem, is a mosaicking method characterized in comprising the steps of: based upon a reduction ratio, being a ratio of a resolution and a reduced resolution of an image that has been input, computing a reduced mosaic block size of a mosaic arranged in a to-be-concealed object of a reduced-resolution image, and comparing said reduced mosaic block size with a predetermined threshold; and in a case where said reduced mosaic block size is less than said predetermined threshold, re-mosaicking the to-be-concealed object of said input image with blocks having a re-mosaic block size such that the mosaic does not disappear visually even though said original image is reduced.

The 21st invention for solving the above-mentioned problem, in the above-mentioned 20th invention, is characterized that said predetermined threshold is a mosaic block size such that an eye of a human cannot perceive said to-be-concealed object in the reduced-resolution image.

The 22nd invention for solving the above-mentioned problem, in the above-mentioned 20th or 21st invention, is characterized that said predetermined threshold is a two-pixel size.

The 23rd invention for solving the above-mentioned problem, in the above-mentioned 20th to 22nd invention, is characterized in performing a re-mosaicking process with blocks having a re-mosaic block size such that an eye of a human cannot perceive the to-be-concealed object in the reduced image in which the original image has been reduced.

The 24th invention for solving the above-mentioned problem, in the above-mentioned 23rd invention, is characterized in re-mosaicking the reduced image of the original image with blocks having a re-mosaic block size such that an eye of a human cannot perceive the to-be-concealed object in the reduced image in which the original image has been reduced.

The 25th invention for solving the above-mentioned problem, in the above-mentioned 23rd invention, is characterized in re-mosaicking the original image with blocks having a re-mosaic block size such that an eye of a human cannot perceive the to-be-concealed object in the reduced image in which the original image has been reduced.

The 26th invention for solving the above-mentioned problem, in the above-mentioned 20th to 25th invention, is characterized in performing a re-mosaicking process on a frequency area.

The 27th invention for solving the above-mentioned problem, is an image processing device capable of storing an edit history, comprising the means for: judging whether an image process of a mosaic exists in the past edit history; in a case where the image process of the mosaic exists in said past edit history, and yet the image is reduced after said image process of said mosaic, computing a reduced mosaic block size of a to-be-concealed object at a reduced resolution, and comparing said reduced mosaic block size with a predetermined threshold; and in a case where said reduced mosaic block size is less than said predetermined threshold, re-mosaicking the to-be-concealed object of the original image with blocks having a re-mosaic block size such that the mosaic does not disappear visually even though said image is reduced.

The 28th invention for solving the above-mentioned problem, is a program of an image processing device capable of storing an edit history, characterized in causing said image processing device to function as a means for judging whether an image process of a mosaic exists in the past edit history; a means for, in a case where the image process of the mosaic exists in said past edit history, and yet the image is reduced after said image process of said mosaic, computing a reduced mosaic block size of a to-be-concealed object at a reduced resolution, and comparing said reduced mosaic block size with a predetermined threshold; and a means for, in a case where said reduced mosaic block size is less than said predetermined threshold, re-mosaicking the to-be-concealed object of the original image with blocks having a re-mosaic block size such that the mosaic does not disappear visually even though said image is reduced.

The 29th invention for solving the above-mentioned problem, is an image processing method in which an image process is performed while storing an edit history, characterized in comprising the steps of: judging whether an image process of a mosaic exists in the past edit history; in a case where the image process of the mosaic exists in said past edit history, and yet the image is reduced after said image process of said mosaic, computing a reduced mosaic block size of a to-be-concealed object at a reduced resolution, and comparing said reduced mosaic block size with a predetermined threshold; and in a case where said reduced mosaic block size is less than said predetermined threshold, re-mosaicking the to-be-concealed object of the original image with blocks having a re-mosaic block size such that the mosaic does not disappear visually even though said image is reduced.

The 30th invention for solving the above-mentioned problem is an image processing device, characterized in comprising a re-mosaicking means for re-mosaicking a to-be-concealed object of an image that has been mosaicked.

The 31st invention for solving the above-mentioned problem, is an image processing device, characterized in comprising a re-mosaicking means for re-mosaicking a to-be-concealed object of an image, which has been mosaicked, with blocks having a mosaic block size such that said to-be-concealed object cannot be recognized visually.

The 32nd invention for solving the above-mentioned problem is a program of an image processing device, characterized in causing said image processing device to function as a re-mosaicking means for re-mosaicking a to-be-concealed object of an image that has been mosaicked.

The 33rd invention for solving the above-mentioned problem is a program of an image processing device, characterized in causing said image processing device to function as a re-mosaicking means for re-mosaicking a to-be-concealed object of an image, which has been mosaicked, with blocks having a mosaic block size such that said to-be-concealed object cannot be recognized visually.

The 34th invention for solving the above-mentioned problem is an image processing method, characterized in re-mosaicking a to-be-concealed object of an image that has been mosaicked.

The 35th invention for solving the above-mentioned problem is an image processing method, characterized in re-mosaicking a to-be-concealed object of an image, which has been mosaicked, with blocks having a mosaic block size such that said to-be-concealed object cannot be recognized visually.

The present invention is characterized in, in such a case that the to-be-concealed object of the image that has been mosaicked results being recognized visually due to reduction etc. of the image, re-mosaicking the to-be-concealed object of the image, which has been mosaicked, with blocks having a mosaic block size such that the to-be-concealed object cannot be recognized visually Further, in the present invention, in a case of reducing the original image in which the to-be-concealed object has been mosaicked so as to have a low resolution, the mosaic block size at the reduced resolution is computed based upon the resolution of the original image and the resolution of the reduced image. And, it is judged whether or not the mosaic block size is a size such that an eye of a human can visually perceive the to-be-concealed object mosaicked with blocks having the above mosaic block size.

The present invention is characterized in, if the eye of a human can perceive the to-be-concealed object mosaicked with the blocks having the reduced mosaic block size, re-mosaicking the to-be-concealed object of the original image with blocks having a re-mosaic block size such that the mosaic does not disappear visually even though the original image is reduced.

EFFECTS OF THE INVENTION

The present invention exhibits the excellent effect that the privacy of the to-be-concealed object, which is re-mosaicked so that the mosaic that is arranged in the to-be-concealed object can be recognized visually, can be protected in the reduced image reduced by lowering the resolution of the original image in which the to-be-concealed object has been mosaicked.

DESCRIPTION OF NUMERALS

100 resolution converter
200 re-mosaicking judger
300 mosaicking device

BEST MODE FOR CARRYING OUT THE INVENTION

Examples of the present invention will be explained.

Example 1

An example 1 of the present invention will be explained.

Figure 6:
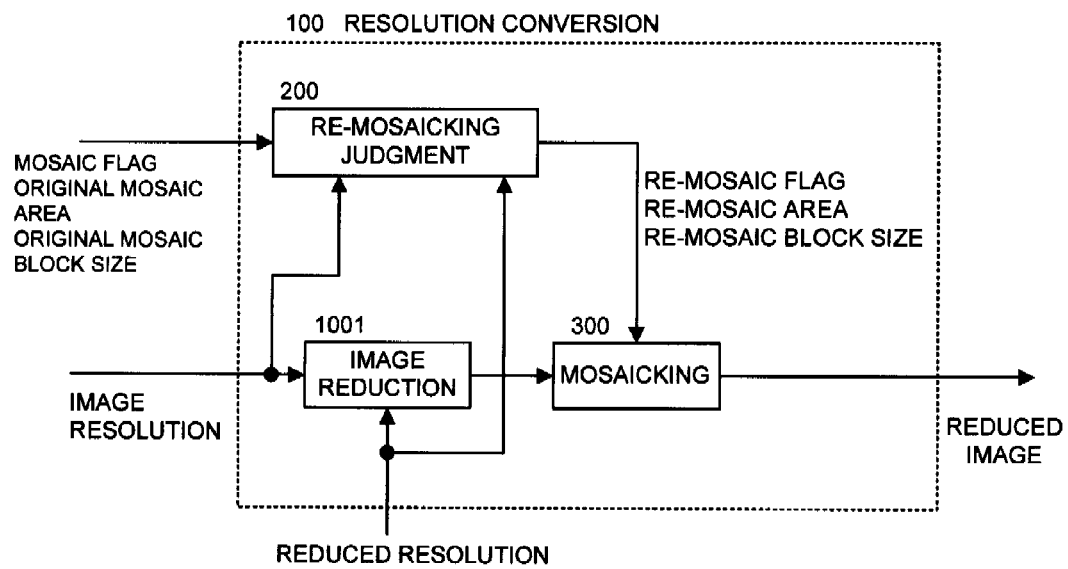
FIG. 6 is a view illustrating a configuration of the resolution converter 100 in an example 1.

A configuration of the resolution converter 100 in the example 1 of the present invention is shown in FIG. 6.

Figure 1:
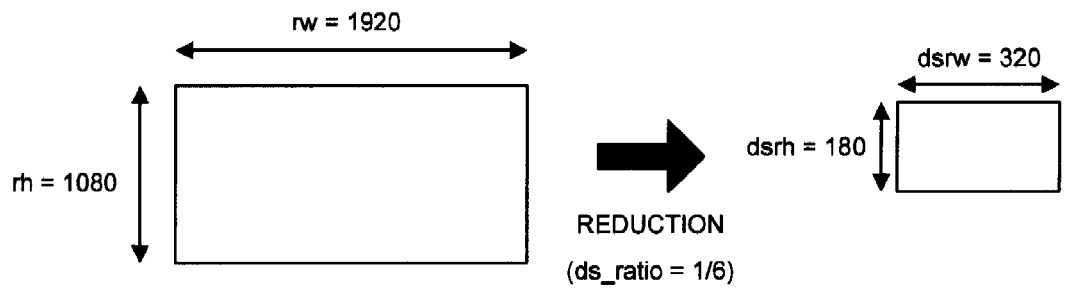
FIG. 1 is a view illustrating an example of reducing the image of high-resolution image contents.
Figure 2:
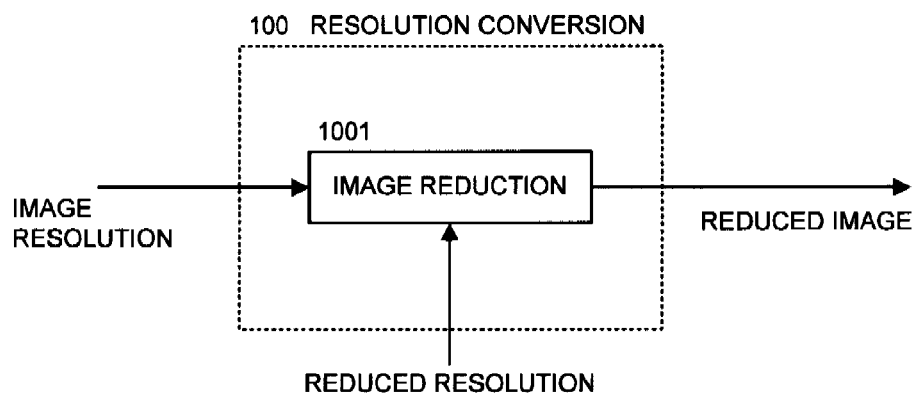
FIG. 2 is a view illustrating the conventional resolution converter 100.
Figure 3:
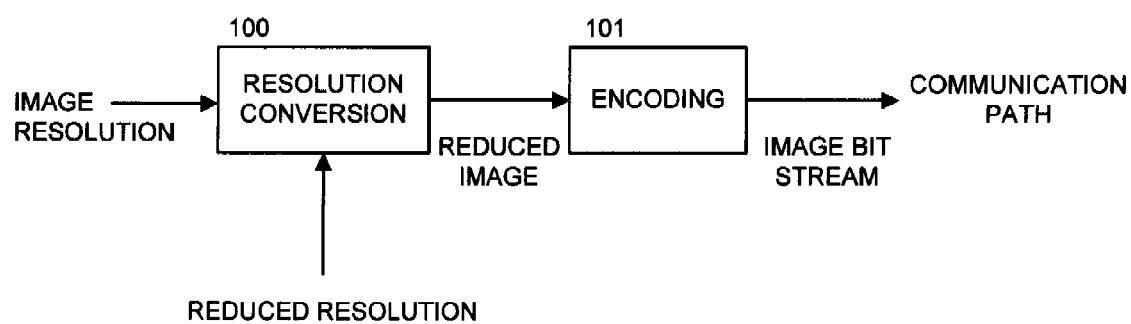
FIG. 3 is a block diagram in the case that the resolution converter 100 has been arranged before the stage of transmitting the image.
Figure 4:
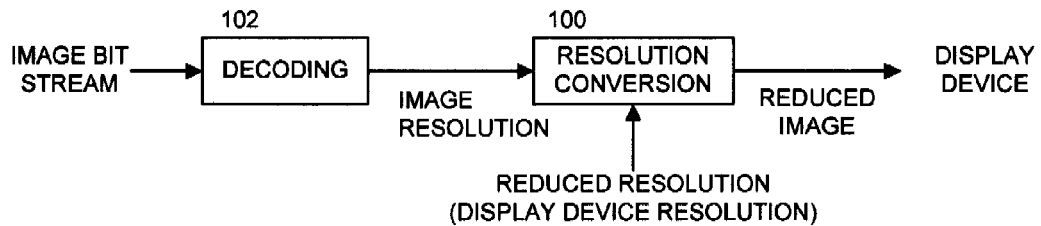
FIG. 4 is a block diagram in the case that the resolution converter 100 has been arranged before the stage of reproducing the image.
Figure 5:
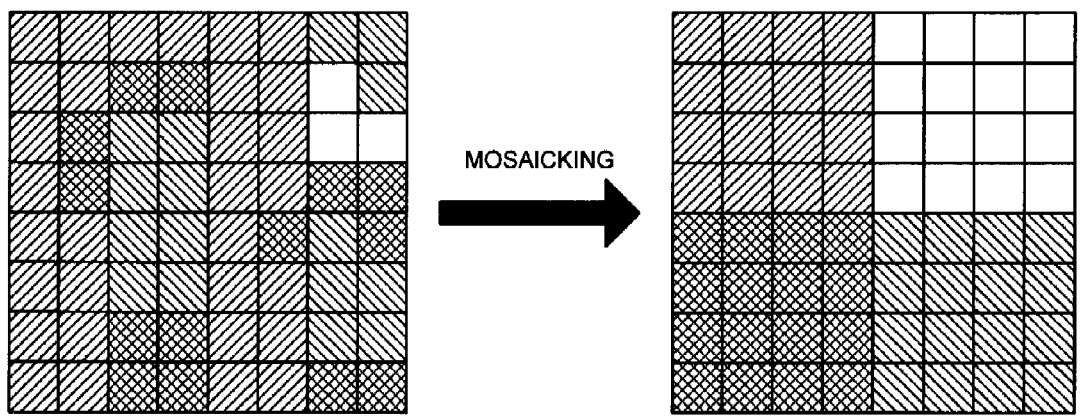
FIG. 5 is a view for explaining a principle of the mosaicking.

The resolution converter 100 of the example 1 differs from the conventional resolution converter 100 shown in FIG. 2 in a point of including a re-mosaicking judger 200 and a mosaicking device 300. Additionally, a configuration of the image reducer 1001 is identical to that of the conventional one, so its detailed explanation is omitted.

Figure 7:
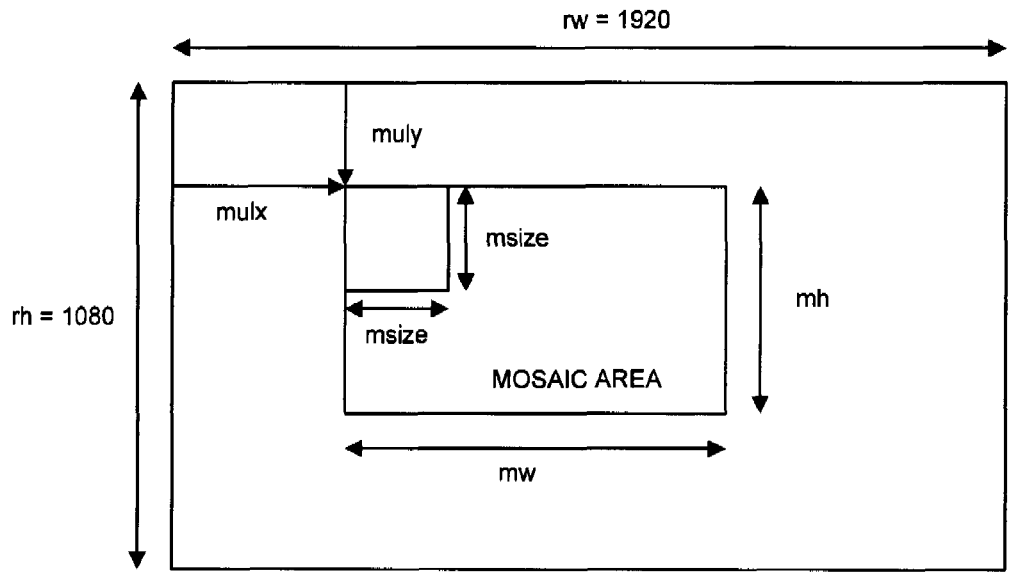
FIG. 7 is a view for explaining a mosaic area etc.

A resolution (rw,rh) and a reduced resolution (dsrw,dsrh) of the input image, a mosaic flag, an original mosaic area, and an original mosaic block size are supplied to the re-mosaicking judger 200. The mosaic flag is information indicating whether or not the mosaic area exists in the input image. When the mosaic flag mozaic_flag is on, as shown in FIG. 7, the original mosaic coordinates and the original mosaic block size msize indicate coordinates (mulx,muly,mw,mh) of the mosaic area and a size of the mosaic block at an input resolution, respectively. Additionally, the resolution (rw,rh) of the input image, the mosaic flag, the original mosaic area, and the original mosaic block size can be acquired by means of a history etc. that is affixed to the input image. Further, a configuration may be made so that the technology of an image recognition is employed to detect the resolution (rw,rh), the mosaic flag, the original mosaic area, and the original mosaic block size.

The re-mosaicking judger 200 computes a mosaic block size ds_msize at the reduced resolution (ds_msize=msize*ds_ratio) from a ratio of the resolution and the reduced resolution of the image that has been input, and judges whether the reduced mosaic block size ds_msize is a size such that the eye of a human can perceive the to-be-concealed object that has been mosaicked. Specifically, the reduced mosaic block size ds_msize, which is close to a one-pixel size at the reduced resolution, is a size such that the eye of a human can perceive the to-be-concealed object that has been mosaicked. For example, in a case where the original mosaic block size msize at the HDTV resolution is an eight-pixel size, and the image is reduced at a level of the QVCA resolution (the reduction ratio is 1/6), the reduced mosaic block size ds_msize at the QVTV resolution becomes a size of approx. one pixel (8×1/6≈1.333), the block-shaped mosaics disappear, and the mosaic looks as if the mosaic had been cancelled.

Thereupon, assume that a re-mosaic flag re_mozaic_flag is on if the reduced mosaic block size ds_msize is equal to or less than a size such that the eye of a human can perceive the to-be-concealed object that has been mosaicked, and the re-mosaic flag re_mozaic_flag is off if it is not so. Further, in a case where the re-mosaic flag re_mozaic_flag is on, a re-mosaic area (mulx2, muly2, mw2, mh2) indicating the mosaic area on the reduced image and re-mosaic block size msize2 are computed.

The foregoing operation of the re-mosaicking judger 200 is described below in a formality-manner.

$$ds\_ratio = dsrw/rw \tag{1}$$

or $$ds\_ratio = dsrh/rh \tag{1'}$$

$$ds\_msize = msize * ds\_ratio \tag{2}$$

if(mozaic_flag=ON AND ds_msize<msize_th)

re_mozaic_flag=ON else $$re\_mozaic\_flag = OFF \tag{3}$$

$$mulx2 = mulx * ds\_ratio \tag{4}$$

$$muly2=muly*ds\_ratio \quad (5)$$

$$mw2=mw*ds\_ratio \quad (6)$$

$$mh2=mh*ds\_ratio \quad (7)$$

$$msize2=\max(ideal\_msize1, ds\_msize) \quad (8)$$

where msize_th, ideal_msize1, and max(a,b) are a threshold of the block size such that the eye of a human can perceive the to-be-concealed object that has been mosaicked, an ideal re-mosaic block size on the reduced resolution such that the mosaic does not disappear visually at the reduced resolution, and a function returning the input value having a large value, respectively. For example, in a case where the mosaic block size ds_msize at the reduced resolution is less than the threshold msize_th, it follows that the eye of a human can perceive the to-be-concealed object, which has been mosaicked, in the reduced image. Thus, in this case, assuming the re-mosaic block size msize2 to be ideal_msize1 larger than ds_msize enables visual disappearance of the mosaic due to reduction to be prevented.

Desirably, the specific value of ideal_msize1 in this embodiment is equal to or more than a four-pixel size (mosaic of 4 pixel by 4 pixel) if the reduced resolution is a QVGA (320 pixel by 240 pixel), and is equal to or more than a three-pixel size (mosaic of 3 pixel by 3 pixel) if the reduced resolution is a SQVGA (Sub QVGA: 160 pixel by 120 pixel). Further, the value of msize_th is desirably equal to or more than a two-pixel size (mosaic of 2 pixel by 2 pixel).

The mosaicking device 300, if the re-mosaic flag re_mozaic_flag that is supplied from the re-mosaicking judger 200 is on, mosaics the re-mosaic area (mulx2, muly2, mw2, mh2) of the reduced image with the blocks having the re-mosaic block size msize2. With the mosaicking process, the foregoing conventional technique may be employed, and needless to say, all pixels within the block may be replaced with one pixel, and may be replaced by an average value.

The operation of the resolution converter 100 in this foregoing embodiment alleviates disappearance of the mosaic block due to reduction. This allows an objectivity of protecting the personal privacy that the mosaic originally has to be attained even though the reduction that incurs lowering the image resolution at an ultimate low level is made.

Example 2

An example 2 of the present invention will be explained.

In the foregoing example 1, the re-mosaicking process was performed after reducing the image. However, it may be performed not after reducing the image but before reducing the image. Thereupon, in the example 2, an example of performing the re-mosaicking process before reducing the image will be explained.

Figure 8:
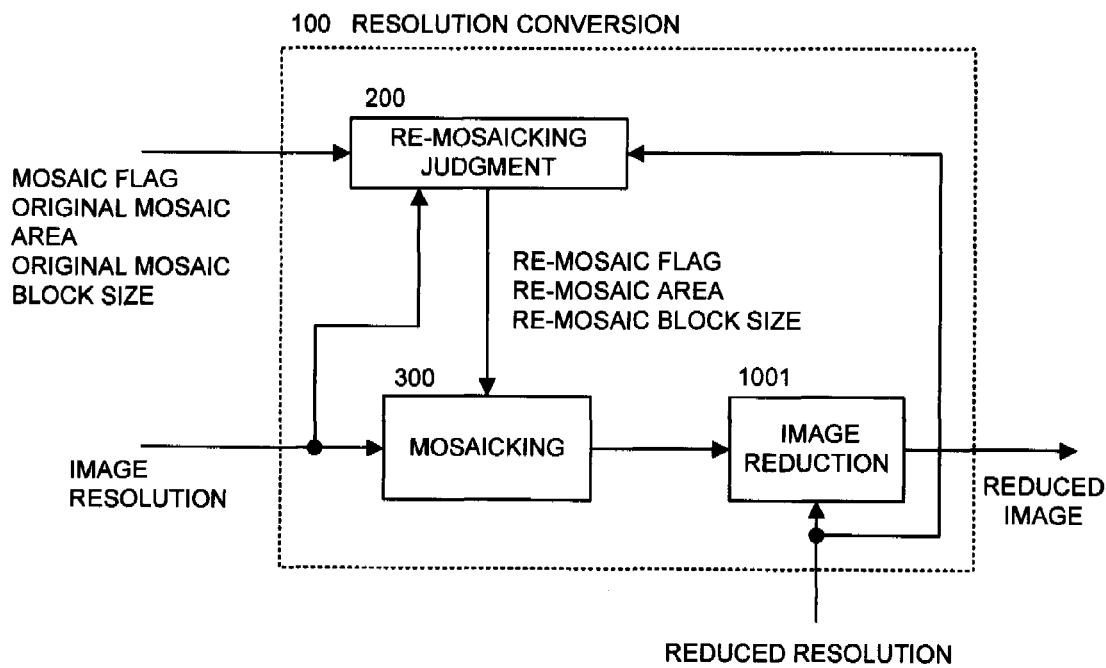
FIG. 8 is a block diagram of the resolution converter 100 in an example 2.

FIG. 8 is a block diagram of the resolution converter 100 in the example 2.

The re-mosaicking judger 200 computes the mosaic block size at the reduced resolution from a ratio of the resolution and the reduced resolution of the image that has been input, and judges whether the reduced mosaic block size ds_msize is a size such that the eye of a human can perceive the to-be-concealed object that has been mosaicked. Additionally, in this case, the reduced mosaic block size ds_msize is a mosaic block size in the case of premising that the original block size has been reduced.

Assume that a re-mosaic flag re_mozaic_flag is on if the reduced block size is a size such that the eye of a human can perceive the to-be-concealed object, and the re-mosaic flag re_mozaic_flag is off if it is not so. Further, in a case where the re-mosaic flag re_mozaic_flag is on, a re-mosaic area (mulx2, muly2, mw2, mh2) indicating the mosaic area on the reduced image and re-mosaic block size msize2 are pre-computed.

The operation of the re-mosaicking judger 200 in this example is described below in a formality-manner.

$$ds\_ratio=dsrw/rw \quad (1)$$

or $$ds\_ratio=dsrh/rh \quad (1)'$$

$$ds\_msize=msize*ds\_ratio \quad (2)$$

if(mozaic_flag=ON AND ds_msize<msize_th)

re_mozaic_flag=ON else $$re\_mozaic\_flag=OFF \quad (3)$$

$$mulx2=mulx \quad (4)'$$

$$muly2=muly \quad (5)'$$

$$mw2=mw \quad (6)'$$

$$mh2=mh \quad (7)'$$

$$msize2=\max(ideal\_msize2, msize) \quad (8)'$$

where ideal_msize2 is an ideal re-mosaic block size on the input resolution that is necessary for preventing the mosaic from disappearing visually at the reduced resolution. For example, in a case where the mosaic block size ds_msize at the reduced resolution is less than the threshold msize_th, it follows that the eye of a human can perceive the to-be-concealed object, which has been mosaicked, in the reduced image. Thus, in this case, assuming the re-mosaic block size msize2 to be ideal_msize2 larger than the original mosaic block size msize enables visual disappearance of the mosaic due to reduction to be prevented beforehand.

Desirably, the specific value of ideal_msize 2 in this embodiment is equal to or more than a size of 4 pixel by (1/ds_ratio) pixel (mosaic of (4×(1/ds_ratio)) pixel by (4×(1/ds_ratio)) pixel) if the reduced resolution is a QVGA (320 pixel by 240 pixel), and is equal to or more than a size of 3 pixel by (1/ds_ratio) pixel (mosaic of (3×(1/ds_ratio)) pixel by (3×(1/ds_ratio)) pixel) if the reduced resolution is a SQVGA (Sub QVGA: 160 pixel by 120 pixel).

Example 3

An example 3 of the present invention will be explained.

In this example 3, an example of utilizing the present invention for the resolution conversion in a frequency area such as DCT (Discrete Cosine Transform) and HT (Hadamard Transform) will be explained.

Figure 9:
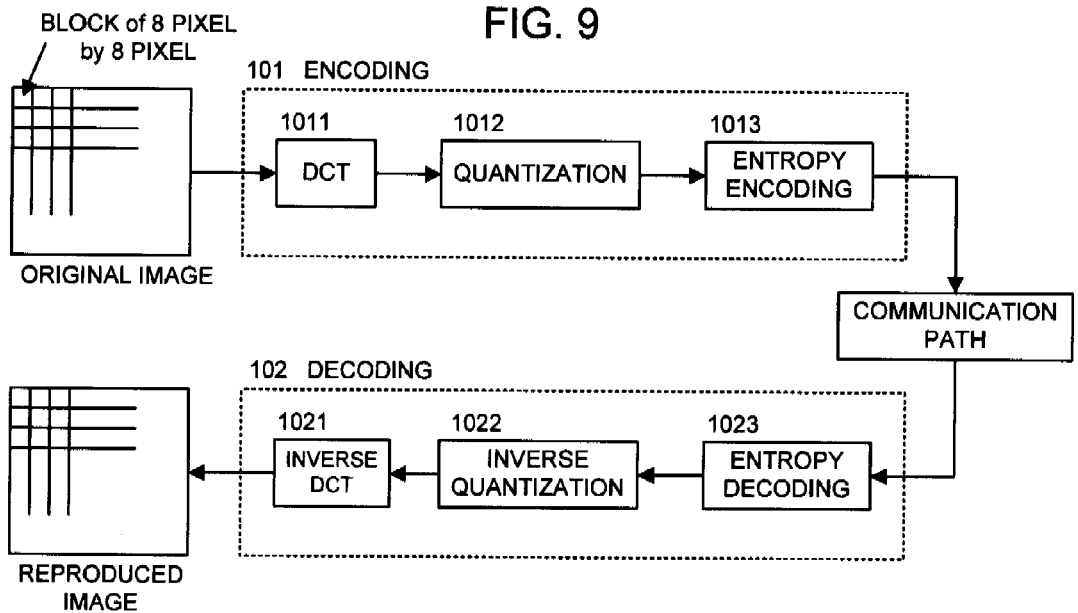
FIG. 9 is a view illustrating transmission and reproduction of the image employing the conventional DCT of a size of 8 pixel by 8 pixel.

At first, in a simple way, transmission and reproduction of the image employing the conventional DCT of a size of 8 pixel by 8 pixel is shown in FIG. 9.

A DCT device 1011 DCT-transforms an image img(xx,yy) ($0 \leq xx \leq width-1$, $0 \leq yy \leq height-1$) in a unit of a block of 8 pixel by 8 pixel, the block-divided image f(x,y) ($0 \leq x \leq 7$, $0 \leq y \leq 7$) is transformed from a pixel space area to a frequency area. A signal of the foregoing DCT-transformed image is called a DCT coefficient.

As a rule, the following equation is utilized for the foregoing DCT.

$$F(u, v) = \frac{2}{N} C(u) C(v) \sum_{x=0}^{N-1} \sum_{y=0}^{N-1} f(x, y) \cos\frac{(2x+1)u\pi}{2N} \cos\frac{(2y+1)v\pi}{2N}$$

Where N, x,y and u,v indicate a block size of the DCT (in this example, N=8), coordinates in the pixel space, and coordinates in the frequency area, respectively, and let $$C(u), C(v) = \begin{cases} \frac{1}{\sqrt{2}} & \text{for } u\ v = 0 \\ 1 & \text{otherwise} \end{cases}$$

A quantizer 1012 quantizes the foregoing DCT coefficient with a quantization step size that corresponds to a quantization parameter. The foregoing quantized DCT coefficient is called a level value.

The foregoing level value, which is entropy-encoded by a entropy encoder 1013, is output as a bit row, i.e. a bit stream. Further, at this time, the foregoing quantization parameter as well is entropy-encoded as an encoding parameter, and is multiplexed into a bit stream.

The bit stream, which is entropy-decoded by an entropy decoder 1023, becomes an original encoding parameter and an original level value.

An inverse quantizer 1022 inverse-quantizes the foregoing decoded DCT coefficient with a quantization step size that corresponds to a quantization parameter, and outputs a DCT coefficient.

An inverse DCT device 1021 inverse-DCT-transforms the foregoing DCT coefficient in a unit of a block of 8 pixel by 8 pixel, and returns the DCT coefficient from the frequency area to the space area. With this, the image can be decoded into an original image f(x,y) from the bit stream in a reproduction side.

As a rule, the following equation is utilized for the foregoing inverse DCT.

$$f(x, y) = \frac{2}{N} \sum_{u=0}^{N-1} \sum_{v=0}^{N-1} C(u) C(v) F(u, v) \cos\frac{(2x+1)u\pi}{2N} \cos\frac{(2y+1)v\pi}{2N}$$

Figure 10:
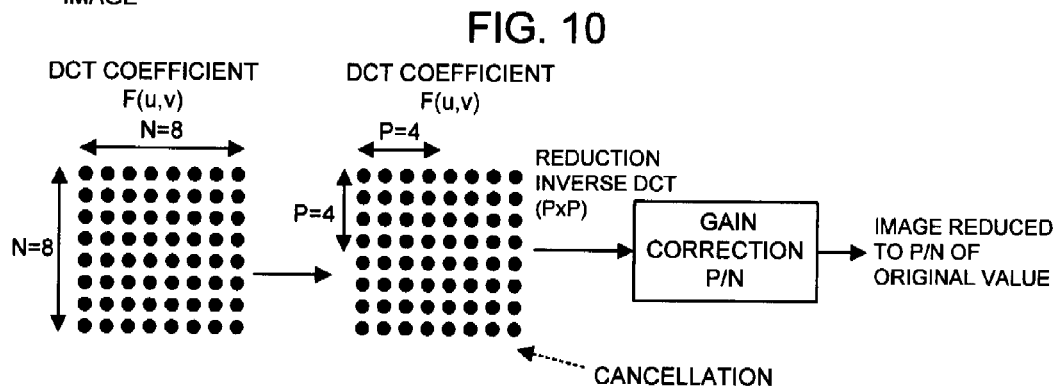
FIG. 10 is a view illustrating an example of reducing a resolution of the image by a factor of two.

In the foregoing image reproducer (decoder) employing the DCT, changing a DCT size (N×N) of the encoding side and an IDCT size (P×P) of the decoding side enables the image to be reduced (N>P). With N and P assumed to be 8 and 4, respectively, an example of reducing the resolution of the image to 4/8=1/2 of the original value is shown in FIG. 10.

Utilizing the foregoing reduced DCT makes it possible to directly reduce the bit stream of the image encoded by employing the DCT.

Figure 11:
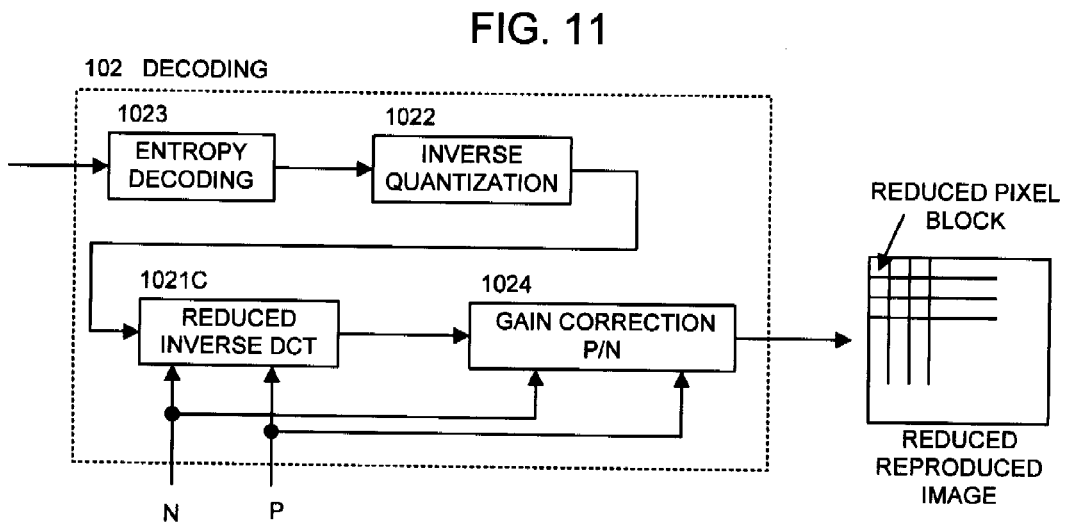
FIG. 11 is a block diagram of the image processing device employing a reduced inverse DCT.

With FIG. 11, assume that the resolution of the original image is org_res, the block size of the DCT of the encoding side is N×N, and the resolution of the reduced image is ds_rest, respectively, the value of p of the block size P×P of the reduced DCT behaves like the following.

P=N*ds_rest/org_res

For example, assume that the resolution of the original image is a HDTV resolution, the resolution of the reduced image is a QVCA resolution, and N=8, respectively, it follows that P=8*1920/320=8/6=1 (round to the nearest whole number), and the resolution of the reduced image is 1/8 (P=1/N=8) of a HDTV resolution (With a reduction ratio of the image in the DCT area, only 1/8, 2/8, 3/8, 4/8, 5/8, 6/8, and 7/8 are possible; however its calculation amount is smaller than that of the reduction in the pixel area, so reduction of the image in the DCT area is often utilized).

However, also in the foregoing resolution conversion in the frequency area, the foregoing disappearance of the mosaic block occurs (in particular, in a case where P=1).

Next, the present invention will be explained.

Figure 12:
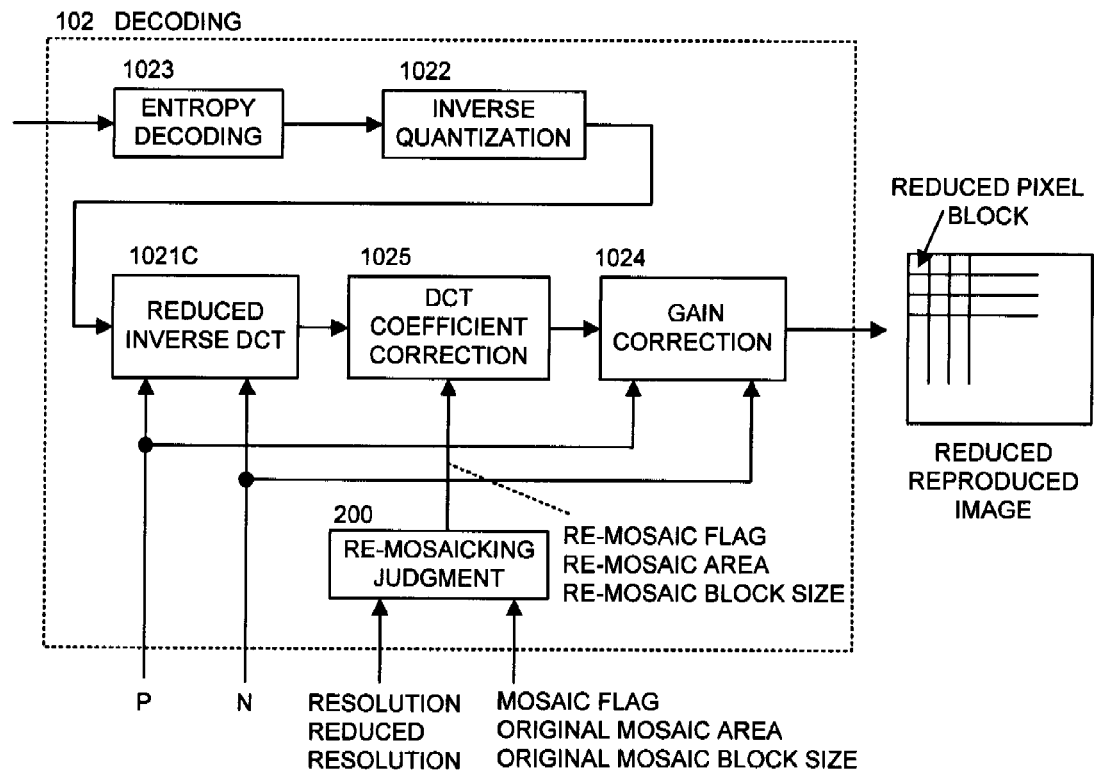
FIG. 12 is a block diagram of the image processing device employing the reduced inverse DCT in an example 3.

The resolution conversion in the frequency area to which the invention technique has been applied, which solves the problem with disappearance of the mosaic block, will be explained by making a reference to FIG. 12.

The example 3 includes a re-mosaicking judger 200 and a DCT coefficient modifier 1025, as compared with FIG. 11. Additionally, the re-mosaicking judger 200 is similar to that of the foregoing example.

The DCT coefficient modifier 1025 performs the process of the following steps for the DCT coefficient of the re-mosaic area in a case where the re-mosaic flag is on.

Step 1: Assume that respective DCT coefficients F(u,v) of N×N blocks that are included in the re-mosaic area are all 0 (zero) except for DC.

F(u,v)=0 for u!=0 and v!=0

Step 2: If P is larger than a re-mosaic block size m_bs, the operation proceeds to a step 3, and if it is not so, the process is terminated.

Step 3: The DCT coefficient modifier 1025 updates the DCT coefficient F(0,0) of N×N blocks that are included in the neighboring re-mosaic area in the following manner so that the re-mosaic size block becomes m_bs.

$$F'_{x,y}(0, 0) = \frac{1}{sz \times sz} \sum_{a=x}^{x+sz-1} \sum_{b=y}^{y+sz-1} F_{a,b}(0, 0)$$

$$sz = \text{m\_bs}/P$$

Where Fx,y'(0,0) and Fx,y(0,0) indicate the DC coefficient of the block coordinates (x,y) after updating, and the DC coefficient of the block coordinates (x,y) before updating, respectively.

The foregoing process allows the block-shaped mosaic of which the size is larger than that of the re-mosaic block m_bs to reappear in the mosaic area of the reduced image.

This makes it possible to solve the problem with disappearance of the mosaic block also in the case of transforming the resolution in the frequency area.

Example 4

Further, as apparent from the foregoing explanation, it is also possible to configure the system with hardware in the foregoing example, and it is also possible to realize it with a computer program.

Figure 13:
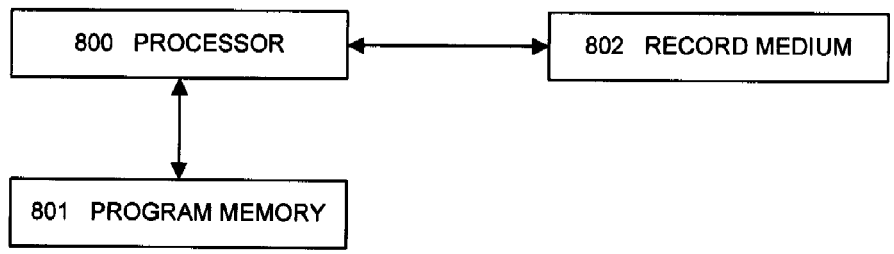
FIG. 13 is a general block diagram of an information processing system having the resolution converter in accordance with the present invention implemented.

FIG. 13 is a general block diagram of an information processing system having the resolution converter in accordance with the present invention implemented.

The information processing system shown in FIG. 13 is comprised of a processor 800, a program memory 801, and a record medium 802. The record medium 802 may be a separate record medium, and may be a storage region that is comprised of an identical storage medium. The magnetic storage medium such as a hard disc can be employed as a storage medium.

A program for causing the processor 800 to perform an operation similar to that of the foregoing re-mosaicking judger 200 and the mosaicking device 300 is filed into the program memory 801, and the processor 800, which operates under this program, performs the process similar to that of the example 1, the example 2, and the example 3.

Example 5

An example 5 of the present invention will be explained.

In a ground digital broadcasting format that prevails hereafter, as mentioned above, out of thirteen segments of one channel, assigning twelve segments to a high-vision broadcast (high-resolution broadcast) and one segment to a mobile body broadcast (low-resolution broadcast) incurs an increase in the opportunity of delivering the identical contents at both of a high resolution and a low-resolution. Thereupon, in the example 5, a transmitter including the foregoing resolution converter 100 of the example 1, the example 2, and the example 3 will be explained.

Figure 14:
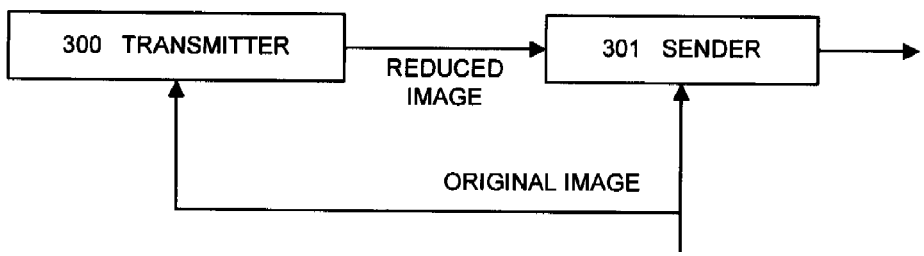
FIG. 14 is a block diagram of a system of an example 5.
Figure 15:
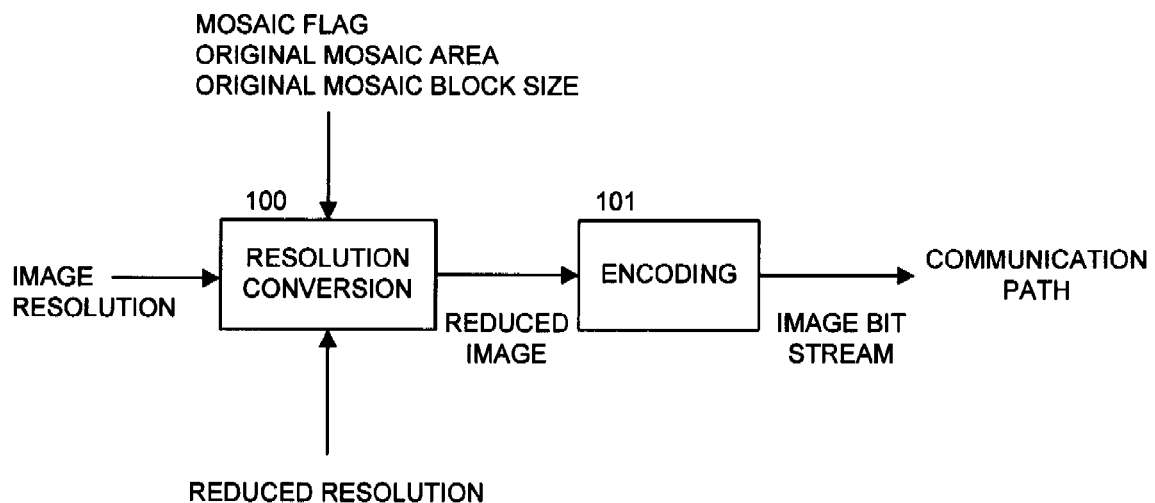
FIG. 15 is a block diagram of a transmitter of the example 5.

FIG. 14 is a block diagram of a system of the example 5, and FIG. 15 is a block diagram of the transmitter of the example 5.

As shown in FIG. 14, this system includes a transmitter 300 into which the image (that has been mosaicked) of a high resolution, for example, a HDTV resolution is input, and a sender 301 into which the high-resolution image, and the image of a low resolution, for example, a QVGA resolution that is output from the transmitter 300 are input.

The transmitter 300 into which the image of a high resolution, for example, a HDTV resolution is input, is for reducing this, thereby to generate and output the image of a low resolution, for example, a QVGA resolution. And, the transmitter 300, as shown in FIG. 15, includes a resolution converter 100 and an encoder 101. The resolution converter 100 has a configuration similar to that of the resolution converter 100 explained in the example 1 and example 2. The encoder 101 is an encoder for encoding the image reduced in the resolution converter 100 and sends out an image bit stream.

The sender 301 inputs the low-resolution image and the high-resolution image that are output from the transmitter 300, and transmits the low-resolution image as an image of a partial hierarchy, and the high-resolution image as an image of a fixed hierarchy In accordance with this example 5, disappearance of the mosaic block due to reduction is alleviated, and the identical contents can be delivered at both of a high-resolution and a low-resolution without any anxiety also in the case that the high-resolution contents is mosaicked and the high-resolution contents is reduced, thereby to deliver the identical contents of which the resolution is low.

Example 6

An example 6 will be explained.

In the example 6, the case of performing the mosaicking reprocess in the reception/reproduction side will be explained.

Figure 16:
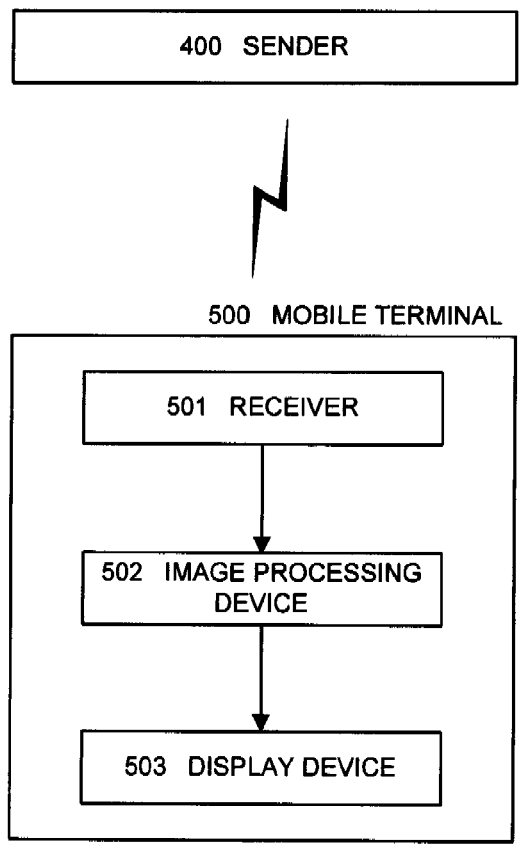
FIG. 16 is a block diagram of a system of an example 6.
Figure 17:
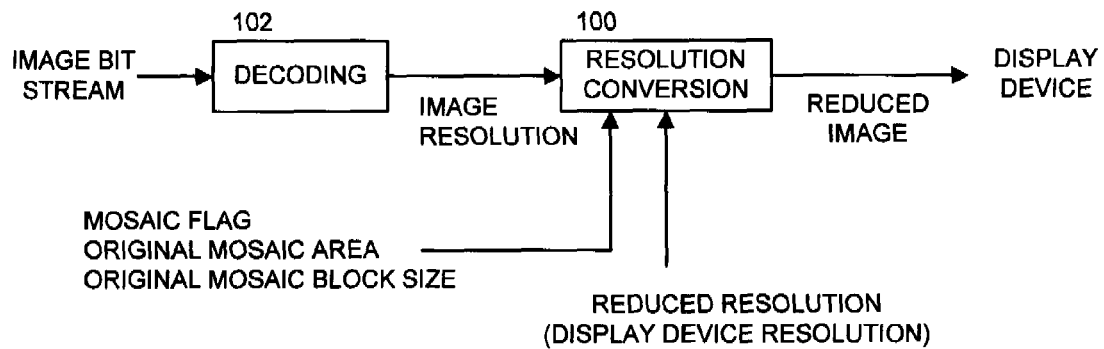
FIG. 17 is a block diagram of an image processing device 502.

FIG. 16 is a block diagram of a system of the example 6, and FIG. 17 is a block diagram of an image processing device 502.

The mosaicked high-resolution image is output as an image bit stream from a sender 400. Additionally, it is assumed that information of the mosaic flag, the original mosaic coordinates, the original mosaic block size relating to this image is multiplexed into an image bit stream, and transmitted.

A mobile terminal 500 includes a receiver 501 for receiving the high-resolution image transmitted from the sender 400, an image processing unit 502 for reducing the received high-resolution image so that it can be displayed on a display device of its own terminal, and a display device 503 such as a display.

The image processing device 502 includes a decoder 102 for inputting and decoding the image bit stream, and a resolution converter 100 for reducing the image so as to have a resolution such that the image can be displayed on the display device of its own terminal, and performing the re-mosaicking process. The resolution converter 100 has a configuration similar to that of the resolution converter 100 explained in the example 1, the example 2, and the example 3.

In accordance with this example 6, preparation of the images each having a different resolution in the sending-out side is not necessitated because high-resolution contents are reduced in the reception side to perform the re-mosaicking process even though the mosaicked high-resolution contents are delivered.

Example 7

An example 7 will be explained.

In the example 7, the case of having applied the present invention to the image processing device for performing the image process while recording an edit history will be explained.

Figure 18:
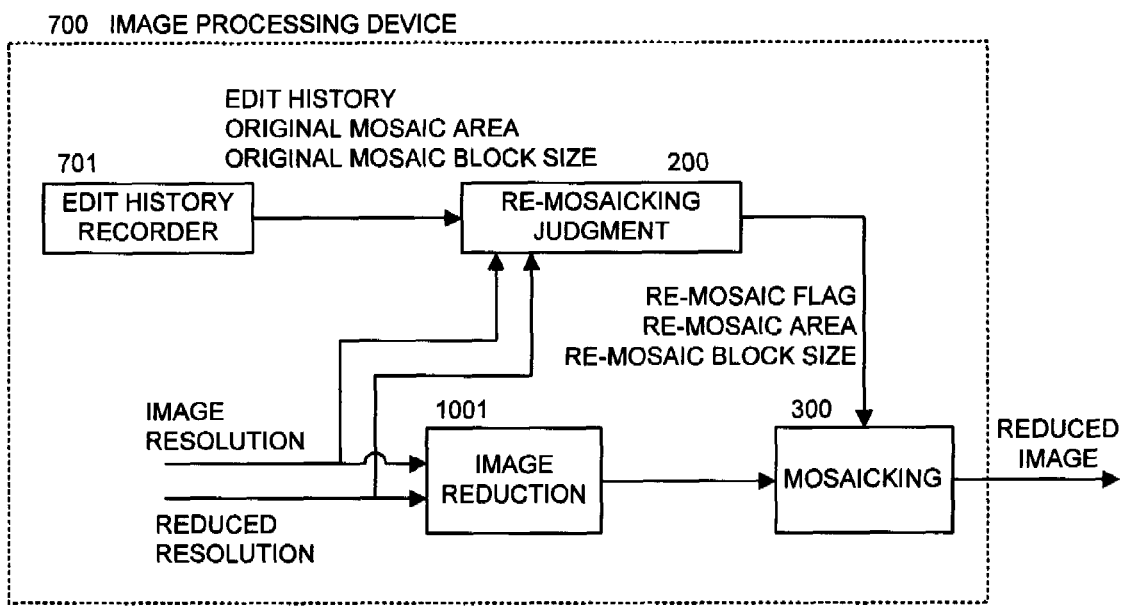
FIG. 18 is a block diagram of an image processing device 700 of an example 7.

FIG. 18 is a block diagram of an image processing device 700 in the example 7.

The image processing device 700 shown in the example 7 includes an edit history recorder 701 for recording an edit history in addition to the components shown in the example 1.

The edit history recorder 701 records the kind of the image process, or the image area etc. for which the process has been performed. For example, in a case of having mosaicked the original image, it records execution (equivalent to the mosaic flag) of the mosaicking process, the original mosaic area, the original mosaic block size, etc. as an edit history.

The mosaic flag, the original mosaic area, and the original mosaic block size are supplied as an edit history to the re-mosaicking judger 200. Further, the resolution (rw,rh) and the reduced resolution (dsrw,dsrh) of the input image are supplied hereto in a case of reduction-process the original image after mosaicking. The re-mosaicking judger 200 judges whether or not the image has been mosaicked in the past from the edit history, and in a case where the image has been mosaicked, judges whether to necessitate the re-mosaicking by means of the operation similar to that of the example 1, thereby to perform the process.

The mosaicking device 300 mosaics the re-mosaic area of the image with the blocks having a re-mosaic block size similarly to that of the example 1 if the re-mosaic flag re_mozaic_flag that is supplied from the re-mosaicking judger 200 is on.

Hereinafter, an operation in the example 7 will be explained below.

Step 1

The re-mosaicking judger 200 judges whether or not the image process of the mosaic exists in the past edit history. If the image process of the mosaic exists, the operation proceeds to a step 2, and if it is not so, the process is terminated.

Step 2

The re-mosaicking judger 200 judges whether or not the following image process is a process relating to reduction. If it is so, the operation proceeds to a step 3, and if it is not so, the process is terminated.

Step 3

The re-mosaicking judger 200 computes the reduced mosaic block size ds_msize with the above-mentioned equation (2), and if this ds_msize is equal to or less than the threshold msize_th, the operation proceeds to a step 4, and if it is more than the threshold msize_th, the process is terminated.

Step 4

The re-mosaicking judger 200 computes the re-mosaic block size msize2 with the above-mentioned equation (4) to equation (8) for the reduced image, and re-mosaics the reduced image with the blocks having the foregoing re-mosaic block size msize2. The reduced image that has been re-mosaicked is output as a result of reduction.

The image processing device in this foregoing example alleviates visual disappearance of the mosaic block due to reduction. This allows an objectivity of protecting the personal privacy that the mosaic originally has to be attained.

Additionally, in the foregoing step 4, if the image that has not been mosaicked (original image that has not been mosaicked) has been stored, the original image that has not been mosaicked may be firstly reduced, thereby to perform the foregoing re-mosaicking process for the reduced original image that has not been mosaicked.

Further, this example is applicable not only to the image processing device, but also an image processing program for performing the image process while storing the edit history. In this case, a CPU that operates under the program performs a similar operation instead of each of the foregoing components, as described in the example 4.

The invention claimed is:

1. An image processing device comprising:
a means for judging whether or not a mosaic block size of a mosaic arranged in a to-be-concealed object of an original image is a size that when the original image is reduced, producing a reduced image, the mosaic in the reduced image fails to conceal the object in the reduced image; and
a re-mosaicking means for, in a case where it has been judged by said judgment means that the mosaic in the reduced image fails to conceal the object, re-mosaicking the to-be-concealed object of said original image with blocks having a re-mosaic block size that when reduced conceal the object in the reduced image.

2. An image processing device comprising:
a comparison means for, based upon a reduction ratio, being a ratio of a resolution and a reduced resolution of an image that has been input, computing a reduced mosaic block size of a to-be-concealed object at the reduced resolution, and comparing said reduced mosaic block size with a predetermined threshold; and
a re-mosaicking means for, in a case where said reduced mosaic block size is less than said predetermined threshold, re-mosaicking the to-be-concealed object of said input image with blocks having a re-mosaic block size that conceal the object in the reduced-resolution image.

3. The image processing device according to claim 2, wherein said predetermined threshold is a mosaic block size that conceals the object in the reduced-resolution image.

4. The image processing device according to claim 2, wherein said predetermined threshold is a two-pixel size.

5. The image processing device according to one of claim 2 to claim 4, wherein said re-mosaicking means re-mosaics the reduced-resolution image of the original image with blocks having a re-mosaic block size that conceal the object in the reduced-resolution image.

6. The image processing device according to one of claim 2 to claim 4, wherein said re-mosaicking means re-mosaics the original image with blocks having a re-mosaic block size that conceal the object in the reduced-resolution image.

7. The image processing device according to one of claim 2 to claim 4, wherein said re-mosaicking means performs a re-mosaicking process on a frequency area.

8. An image transmitter comprising:
a comparison means for, based upon a reduction ratio, being a ratio of a resolution and a reduced resolution of an image that has been input, computing a reduced mosaic block size of a mosaic arranged in a to-be-concealed object of a reduced-resolution image, and comparing said reduced mosaic block size with a predetermined threshold;
a re-mosaicking means for, in a case where said reduced mosaic block size is less than said predetermined threshold, re-mosaicking the to-be-concealed object of said original image with blocks having a re-mosaic block size that conceal the object in the reduced-resolution image; and
a transmission means for encoding the re-mosaicked image to transmit it.

9. An information processing terminal comprising:
a decoding means for decoding received image data;
a comparison means for, based upon a reduction ratio of a resolution of said decoded image over that of an original image, computing a mosaic block size of a mosaic arranged in a to-be-concealed object of said original image, and comparing said mosaic block size with a predetermined threshold;
a re-mosaicking means for, in a case where said mosaic block size is less than said predetermined threshold, re-mosaicking the to-be-concealed object of said original image with blocks having a re-mosaic block size that conceal the object in the decoded image; and
a display means for displaying the re-mosaicked image.

10. A non-transitory computer readable medium having stored thereon an image processing program of an image processing device, that when executed by a processor performs a method comprising:
judging whether or not a mosaic block size of a mosaic arranged in a to-be-concealed object of an original image is a size such that reducing the original image allows the mosaic to disappears visually; and
in a case where it has been judged that the mosaic arranged in said to-be-concealed object fails to conceal the object, re-mosaicking the to-be-concealed object of said original image with blocks having a re-mosaic block size that conceal the object in the reduced image.

11. A non-transitory computer readable medium having stored thereon an image processing program of an image processing device, that when executed by a processor performs a method comprising:
computing, based upon a reduction ratio, being a ratio of a resolution and a reduced resolution of an image that has been input, a reduced mosaic block size of a mosaic arranged in a to-be-concealed object of a reduced-resolution image;
comparing said reduced mosaic block size with a predetermined threshold; and re-mosaicking, in a case where said reduced mosaic block size is less than said predetermined threshold, the to-be-concealed object of said original image with blocks having a re-mosaic block size that conceal the object in the reduced-resolution image.

12. The non-transitory computer readable medium according to claim 11, wherein said predetermined threshold is a mosaic block size that conceals the object in the reduced-resolution image.

13. The non-transitory computer readable medium according to claim 11, wherein said predetermined threshold is a two-pixel size.

14. The non-transitory computer readable medium according to according to one of claim 11 to claim 13, wherein the re-mosaicking re mosaics the reduced image of the original image with blocks having a re-mosaic block size that conceal the object in the reduced-resolution image.

15. The non-transitory computer readable medium according to according to one of claim 11 to claim 13, wherein the re-mosaicking re mosaics the original image with blocks having a re-mosaic block size that conceal the object in the reduced-resolution image.

16. The non-transitory computer readable medium according to one of claim 11 to claim 13, the re-mosaicking is performed on a frequency area.

17. A mosaicking method, comprising the steps of:
judging whether or not a mosaic block size of a mosaic arranged in a to-be-concealed object of an original image is a size that when the original image is reduced, producing a reduced image, the mosaic in the reduced image fails to conceal the object in the reduced image; and
in a case where it has been judged that the mosaic in the reduced image fails to conceal the object, re mosaicking the to-be-concealed object of said original image with blocks having a re-mosaic block size that when reduced, conceal the object in the reduced image.

18. A mosaicking method comprising the steps of:
based upon a reduction ratio, being a ratio of a resolution and a reduced resolution of an image that has been input, computing a reduced mosaic block size of a mosaic arranged in a to-be-concealed object of a reduced-resolution image, and comparing said reduced mosaic block size with a predetermined threshold; and
in a case where said reduced mosaic block size is less than said predetermined threshold, re-mosaicking the to-be-concealed object of said input image with blocks having a re-mosaic block size that conceal the object in the reduced-resolution image.

19. The mosaicking method according to claim 18, wherein said predetermined threshold is a mosaic block size that fails to conceal the to be-concealed object in the reduced-resolution image.

20. The mosaicking method according to claim 18, wherein said predetermined threshold is a two-pixel size.

21. The re-mosaicking method according to according to one of claim 18 to claim 20, wherein the re-mosaicking the reduced image of the original image is performed with blocks having a re-mosaic block size that conceal the to-be-concealed object in the reduced.

22. The re-mosaicking method according to according to one of claim 18 to claim 20, wherein the re-mosaicking of the original image is performed with blocks having a re-mosaic block size that conceal the to-be-concealed object in the reduced image in which the original image has been reduced.

23. The re-mosaicking method according to one of claim 18 to claim 21, wherein the re-mosaicking is performed on a frequency area.

24. An image processing device capable of storing an edit history of an image, comprising:
a judgement unit for judging whether an image process of a mosaic exists in the past edit history;
in a case where a mosaic image process exists in said past edit history, and the image is reduced after said mosaic image process is performed, computing a reduced mosaic block size of a to-be-concealed object at a reduced resolution, and comparing said reduced mosaic block size with a predetermined threshold; and
in a case where said reduced mosaic block size is less than said predetermined threshold, re-mosaicking the to-be-concealed object of the image with blocks having a re-mosaic block size that conceal the to-be-concealed object in the reduced image.

25. A non-transitory computer readable medium having stored thereon a program of an image processing device capable of storing an edit history, the program, when executed by a processor causing said image processing device to perform a method comprising:
judging whether a mosaic image process exists in the edit history;
in a case where the mosaic image process exists in said edit history, and the image is reduced after said mosaic image process is performed, computing a reduced mosaic block size of a to-be-concealed object at a reduced resolution, and comparing said reduced mosaic block size with a predetermined threshold; and
in a case where said reduced mosaic block size is less than said predetermined threshold, re-mosaicking the to-be-concealed object of the original image with blocks having a re-mosaic block size that conceal the to-be-concealed object in the reduced image.

26. An image processing method in which an image process is performed while storing an edit history, comprising the steps of:
judging whether an image process of a mosaic exists in the edit history;
in a case where the mosaic image process exists in said edit history, and the image is reduced after said mosaic image process is performed, computing a reduced mosaic block size of a to-be-concealed object at a reduced resolution, and comparing said reduced mosaic block size with a predetermined threshold; and
in a case where said reduced mosaic block size is less than said predetermined threshold, re-mosaicking the to-be-concealed object of the original image with blocks having a re-mosaic block size that conceal the to-be-concealed object in the reduced image.

* * * * *